United States Patent
Chu et al.

(10) Patent No.: US 11,737,133 B2
(45) Date of Patent: Aug. 22, 2023

(54) QOS GUARANTEE FOR HIGH PRIORITY LOW LATENCY SERVICE

(71) Applicant: NXP USA, Inc., Austin, TX (US)

(72) Inventors: Liwen Chu, San Ramon, CA (US); Young Hoon Kwon, Laguna Niguel, CA (US); Hongyuan Zhang, Fremont, CA (US); Huiling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 300 days.

(21) Appl. No.: 17/181,904

(22) Filed: Feb. 22, 2021

(65) Prior Publication Data

US 2021/0360646 A1    Nov. 18, 2021

Related U.S. Application Data

(60) Provisional application No. 63/081,018, filed on Sep. 21, 2020, provisional application No. 63/072,030, filed on Aug. 28, 2020, provisional application No. 62/984,120, filed on Mar. 2, 2020.

(51) Int. Cl.
*H04W 72/00* (2023.01)
*H04W 72/56* (2023.01)
*H04W 74/08* (2009.01)
*H04W 52/02* (2009.01)

(52) U.S. Cl.
CPC ....... *H04W 72/56* (2023.01); *H04W 52/0229* (2013.01); *H04W 74/0808* (2013.01)

(58) Field of Classification Search
None
See application file for complete search history.

(56) References Cited

U.S. PATENT DOCUMENTS

| 11,523,306 | B1* | 12/2022 | Chu | H04W 28/18 |
|---|---|---|---|---|
| 2016/0219522 | A1* | 7/2016 | Asterjadhi | H04W 52/0216 |
| 2019/0053155 | A1* | 2/2019 | Kneckt | H04W 76/28 |
| 2020/0084102 | A1* | 3/2020 | Choi | H04W 12/08 |
| 2020/0137612 | A1* | 4/2020 | Li | H04W 28/0221 |
| 2021/0022154 | A1* | 1/2021 | Cavalcanti | H04W 72/0446 |
| 2021/0037546 | A1* | 2/2021 | Luo | H04W 72/569 |
| 2022/0286947 | A1* | 9/2022 | Cavalcanti | H04W 48/16 |

OTHER PUBLICATIONS

Priority Access Support in IEEE 802.11be: What and Why?—doc. IEEE 802.11-19/19014r dated Nov. 10, 2019; 19 pgs.

* cited by examiner

*Primary Examiner* — Alex Skripnikov

(57) ABSTRACT

Various embodiments relate to a method performed by a first wireless device for providing a high priority communication service for a high priority traffic class between a first wireless device and a second wireless device, including: announcing support for the high priority communication service; receiving an association request from the second wireless device for the transmission of high priority traffic using the high priority communication service; accepting the received association request; and negotiating a restricted target wakeup time (TWT) service period (SP) for the high priority communication service between the first wireless device and the second wireless device, wherein higher priority is given for the transmission of high priority frames using the high priority traffic service.

29 Claims, 2 Drawing Sheets

QOS GUARANTEE FOR HIGH PRIORITY LOW LATENCY SERVICE

CROSS-REFERENCE TO RELATED APPLICATIONS

This application claims benefit to U.S. Provisional Patent Application No. 62/984,120 filed on Mar. 2, 2020, 63/072,030 filed on Aug. 28, 2020, and 63/081,018 filed on Sep. 21, 2020, the contents of each which are hereby incorporated by reference for all purposes as if fully set forth herein.

TECHNICAL FIELD

Various exemplary embodiments disclosed herein relate generally to quality of service (QoS) for high priority low latency services in wireless networks.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method performed by a first wireless device for providing a high priority communication service for a high priority traffic class between a first wireless device and a second wireless device, including: announcing support for the high priority communication service; receiving an association request from the second wireless device for the transmission of high priority traffic using the high priority communication service; accepting the received association request; and negotiating a restricted target wakeup time (TWT) service period (SP) for the high priority communication service between the first wireless device and the second wireless device, wherein higher priority is given for the transmission of high priority frames using the high priority traffic service.

Various embodiments are described, further including receiving a TWT set up request from the second wireless device.

Various embodiments are described, wherein support for the high priority service is announced in a management frame.

Various embodiments are described, wherein a trigger frame sent by the first wireless device is configured to solicit high priority traffic frames.

Various embodiments are described, wherein a buffer status report for high priority traffic frames is received from the second wireless device in response to the trigger frame.

Various embodiments are described, wherein the buffer status report for high priority traffic is explicitly or implicitly indicated.

Various embodiments are described, wherein the buffer status report of high priority traffic is indicated by the high efficiency (HE) control filed.

Various embodiments are described, further including announcing high priority enhanced distributed channel access (EDCA) parameters for high priority traffic.

Various embodiments are described, wherein the EDCA parameters includes an element ID and element ID extension.

Various embodiments are described, wherein the EDCA parameters includes a CWmax that is smaller than the CWmax value for non-high priority traffic.

Various embodiments are described, wherein the EDCA parameters includes an CWmin and CWmax that are smaller than the CWmin and CWmax values for non-high priority traffic.

Various embodiments are described, wherein the EDCA parameters includes an AIFSN that gives the high priority traffic a higher priority to use a medium.

Various embodiments are described, wherein the first wireless device cannot disable the high priority EDCA.

Various embodiments are described, wherein the first wireless device cannot disable the high priority EDCA unless sufficient resources are allocated to the high priority service.

Various embodiments are described, further including receiving an announcement from the second wireless device indicating the traffic characteristics its high priority traffic.

Various embodiments are described, wherein negotiating the restricted TWT SP for the high priority communication service is based upon the announced traffic characteristics.

Various embodiments are described, wherein the announced traffic characteristics are in an enhanced traffic specification (TSPEC) element, wherein the enhance TSPEC element includes one of peak data rate, mean data rate, inactive interval, and burst size.

Various embodiments are described, wherein the first wireless device announces support of the high priority communication service using an extended capability element.

Various embodiments are described, further including receiving an announcement from the second wireless device configured to announce support of the high priority communication service using an extended capability element.

Various embodiments are described, wherein the first wireless device only accepts the received association request when the second wireless device supports the high priority communication service.

Various embodiments are described, wherein the negotiated TWT SP includes a service type field indicating the type of service associated with the TWT SP.

Various embodiments are described, wherein the negotiated TWT SP is an individual TWT request.

Various embodiments are described, wherein the negotiated TWT SP is an broadcast TWT request.

Various embodiments are described, wherein only high priority traffic and associated control frames are transmitted during the restricted TWT SP.

Various embodiments are described, wherein the negotiated TWT SP is an individual TWT request.

Various embodiments are described, wherein non-high priority traffic and associated control frames may only be transmitted during the restricted TWT SP after all high priority traffic has been transmitted.

Various embodiments are described, wherein the first wireless device is a multi-link device (MLD) and the second wireless device is a MLD, further including: negotiating a traffic identifier (TID) to link mapping rules to support the high priority communication service.

Various embodiments are described, wherein negotiating a restricted TWT SP is based upon availability information from a third wireless device, wherein the second wireless device and the third wireless device implement peer to peer transmission.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

In the United States, DHS/ECD (Department of Homeland Security/Emergency Communications Division) priority telecommunications programs provide national security and emergency preparedness (NS/EP) and public safety users the ability to communicate on public telecommunications networks during times of congestion. There is a requirement to use Wi-Fi access networks in scenarios where Wi-Fi access may be the only available access networks such as inside a building, airports, stadiums or places where there is no cellular radio coverage available during NS/EP event. The same requirements arise for any service requiring guaranteed QoS, where for example the traffic requires low latency, requires immediate access to the network, and is high priority traffic. Embodiments of a Wi-Fi network will be described that allow for access to a congested network for high priority traffic. While NS/EP frames and traffic will be described herein as an example, it is noted that the embodiments herein are applicable to any type of high priority, low latency data frames and traffic that need a guaranteed QoS even when the network is congested.

Figure 1:
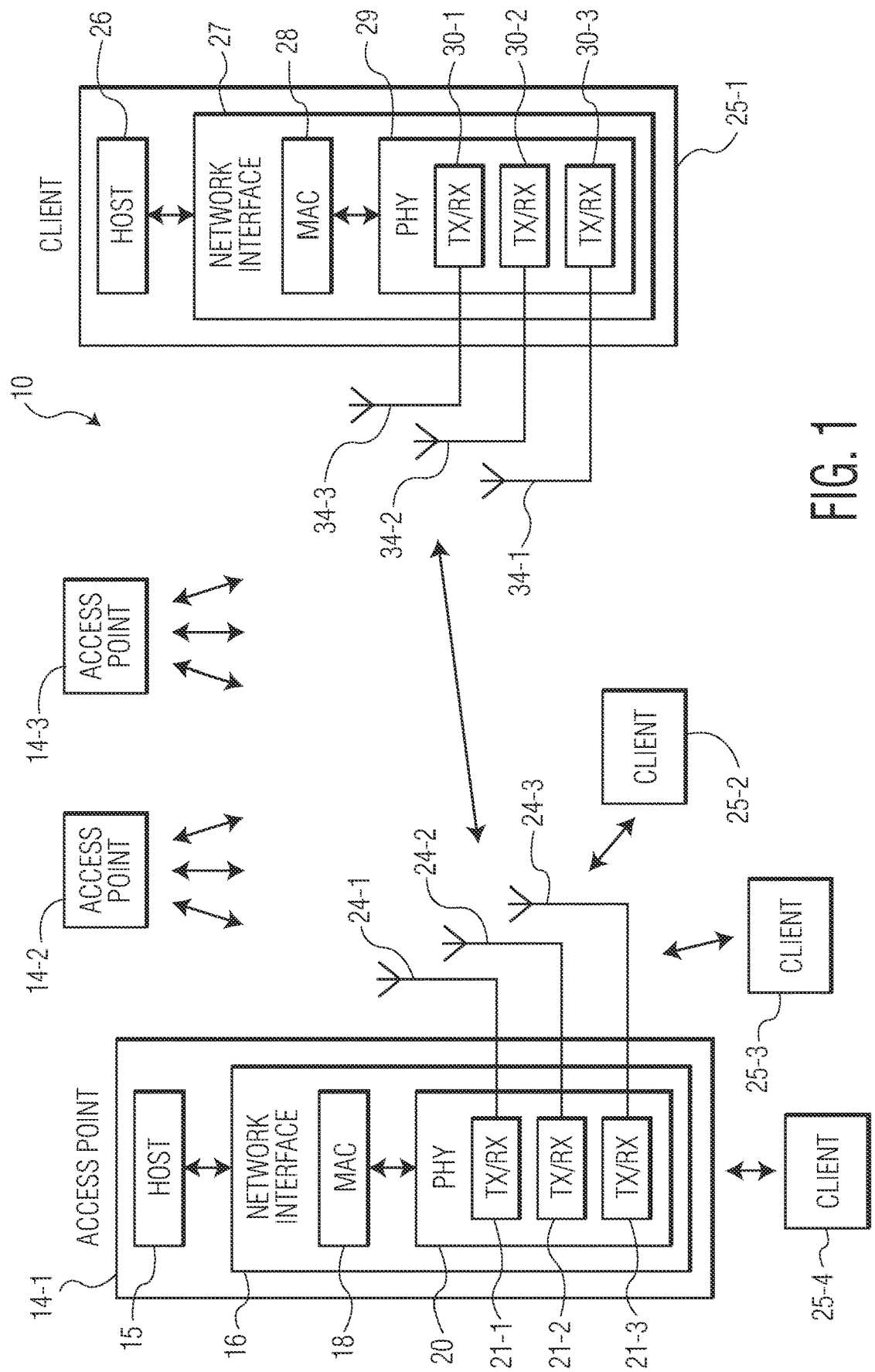
FIG. 1 is a block diagram of an example wireless local area network (WLAN), according to an embodiment.

FIG. 1 is a block diagram of an example wireless local area network (WLAN) 10, according to an embodiment. Such a WLAN 10 may need to provide access to high priority traffic in order to meet QoS guarantees. An access point (AP) 14-1 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24.

Although three transceivers 21 and three antennas 24 are illustrated in FIG. 1, the AP 14 may include different numbers (e.g., 1, 2, 4, 5, etc.) of transceivers 21 and antennas 24 in other embodiments. The WLAN 10 may include multiple APs 14-1, 14-2, 14-3 as shown, but any number of APs 14 may be included in WLAN 10.

The WLAN 10 includes a plurality of client stations (STA) 25. Although four client stations 25 are illustrated in FIG. 1, the WLAN 10 may include different numbers (e.g., 1, 2, 3, 5, 6, etc.) of client stations 25 in various scenarios and embodiments. The WLAN 10 may also include AP multi-link device (MLD) where one AP MLD includes multiple affiliated APs and client STA multi-link devices (MLD) where one STA MLD includes multiple affiliated STAs. Two or more of the STAs of an STA MLD 25 are configured to receive corresponding data streams that are transmitted simultaneously by the AP 14. Additionally, two or more of the STAs of an STA MLD 25 are configured to transmit corresponding data streams to one AP MLD 14 such that the AP MLD 14 simultaneously receives the data streams. Also, the client station MLD 25 are configured to receive data streams that are transmitted simultaneously by multiple APs of one AP MLD 14. Likewise, the STAs of an STA MLD 25 may transmit data streams simultaneously to the multiple APs of an AP MLD 14. Client stations/MLDs 25 may have high priority traffic that needs to be transmitted, even when the network is congested. For example, emergency teleconference services may be given higher priority so as to achieve low latency and access to the congested network. Client stations/MLDs may have low latency traffic that needs to be transmitted.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 may include different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

In an embodiment, one client STA MLD includes a host processor 26 coupled to multiple network interfaces 27 where each network interface has one STA affiliated with it.

In an embodiment, the APs 14 and the client stations 25 contend for communication medium using carrier sense multiple access with collision avoidance (CSMA/CA) protocol or another suitable medium access protocol. Further, in an embodiment, the APs 14 or a client station 25 dynamically selects a bandwidth for a transmission based on channels available for the transmission.

In an embodiment, one AP MLD includes a host processor 26 coupled to multiple network interfaces where each network interface has one AP affiliated with it.

In an embodiment, the APs 14 are configured to simultaneously transmit different orthogonal frequency division multiplexing (OFDM) units to different client stations 25 by forming an OFDM access (OFDMA) data unit that includes the different OFDM data units modulated in respective sub-channel blocks of the OFDMA data unit. In an embodiment, the AP 14 allocates different sub-channels to different client stations and forms the OFDMA data unit that includes OFDM data units directed to by modulating the different client stations in sub-channel blocks corresponding to the sub-channels assigned to the client stations.

In an embodiment, the APs 14 are configured to simultaneously transmit different OFDM units to different client stations 25 by transmitting the different OFDM data units via different space time streams of a MU-MIMO communication channel. In an embodiment, the APs 14 allocates different sub-channels (i.e., space time streams) to different client stations and forms the OFDM data units and modulates the different OFDM data units to the space time streams corresponding to the sub-channels assigned to the client stations.

An AP may send out a trigger frame to determine from various STAs in the network what traffic or data frames they have to send. In response the AP will allocate specific resource units (RUs) for the STAs to use in their transmission of their data frames. The STAs typically buffer data frames for transmission. Once, the STA is assigned RUs, the STA can then transmit its data frames in the assigned RUs. If a STA cannot indicate that its buffered data frames are NS/EP (or other high priority low latency) data frames, then such data frames may be delayed. Accordingly, if the AP is configured to handle NS/EP (or other high priority low latency) data frames, then the trigger frame sent to the STAs may solicit information regarding NS/EP (or other high priority low latency) frames to transmit. Further, trigger dependent user information in the trigger frame may be used to solicit this information. This trigger frame may be a buffer status report poll (BSRP) trigger. When a STA enables the NS/EP or other low latency service only or enables them in a specific period (e.g., a specific TWT SP), the current BSRP Trigger may be used to solicit the buffer status from the STA for the NS/EP or other low latency service. When a STA enables the NS/EP or other low latency service besides the other services, the updated BSRP Trigger may be used to solicit the buffer status from the STA for the NS/EP or other low latency service (i.e., explicitly indicate whether the buffer status of low latency service is solicited).

The STA responds to the trigger frame by sending a buffer status report (BSR). There are two ways that the BSR may indicate the presence of NS/EP (or other high priority low latency) frames. First, QoS control with a specific traffic identifier (TID) may indicate the status of NS/EP frames to be transmitted. A second option may include the use of high efficiency (HE) control filed in an updated BSR to indicate the NS/EP (or other high priority low latency) buffer status. When a STA enables the NS/EP or other low latency service only or enables them in a specific period (e.g., a specific TWT SP), the current QoS Control/BSR may be used to report the buffer status from the STA for the NS/EP or other low latency service. When a STA enables the NS/EP or other low latency service besides the other services, the updated QoS Control/BSR may be used to solicit the buffer status from the STA for the NS/EP or other low latency service (i.e., explicitly indicate whether the buffer status of low latency service is reported).

In order to guarantee service for NS/EP frame transmission, enhanced distributed channel access (EDCA) may be used. When NS/EP frames are to be serviced, separate EDCA parameters may be announced that are different and separate from the normal EDCA parameters. The EDCA parameters for NS/EP frame transmission give NS/EP frames higher priority access to the transmission medium, especially when the network becomes congested. Accordingly, a new NS/EP EDCA parameter set element is defined. The NS/EP EDCA parameter set element has new Element ID and Element ID Extension, but the format of it is same as EDCA Parameter Set element, i.e., QoS Info, Updated EDCA Info, AC_BE Parameter Record, AC_BK Parameter Record, AC_VI Parameter Record, AC_VO Parameter Record. In one embodiment, the QoS Info is not included. In one embodiment AC_BE Parameter Record, AC_BK Parameter Record are not included. These new ESCA parameters with smaller CWmin, CWmax and/or AIFSN give NS/EP traffic higher priority to use the medium. In one embodiment, only smaller CWmax is used to give NS/EP traffic higher priority to use the medium.

In one option, an AP cannot disable the EDCA of NS/EP frame transmission through NS/EP MU EDCA Parameter Set. This prevents the AP from interfering with NS/EP frame transmission. Alternatively, the AP cannot disable the EDCA of NS/EP frame transmission through NS/EP MU EDCA Parameter Set unless sufficient resources are allocated to the NS/EP service in the trigger based (TB) physical layer protocol data units (PPDUs).

In order to help AP's scheduling of TB PPDU for low latency service or NS/EP service, a STA may announce the traffic characteristics of its low latency service or NS/EP service, e.g., through an enhanced traffic specification (TSPEC) element. The enhanced TSPEC element may include peak data rate, mean data rate, inactive interval, burst size, etc. Also, the traffic characteristics of the low latency service or NS/EP service may also help in the selection of target wakeup time (TWT) service period (SP) parameters (SP interval, SP duration) for the NS/EP service and the decision about whether a TWT request is accepted. In one embodiment, the enhanced TSPEC includes the traffic type (e.g., type 1 as low latency service, type 2 as NS/EP service or other high priority low latency service).

TWT allows an AP to manage activity in the Wi-Fi network, in order to guarantee the medium time for a STA, minimize medium contention between STAs and to reduce the required amount of time that an STA in the power-save mode needs to be awake. This is achieved by allocating STAs to operate at non-overlapping times and/or frequencies and to concentrate the frame exchanges in predefined service periods.

A TWT capable STA may either negotiate an individual TWT agreement with TWT-scheduling AP, or it may elect to be part of a Broadcast TWT agreement existing on the AP. A STA does not need to be aware that a TWT SP may be used to exchange frames with other STAs. Frames transmitted during a TWT SP may be carried in any PPDU format supported by the pair of STAs that have established the TWT agreement corresponding to that TWT SP, including Extreme High Throughput Multi-User Physical Protocol Data Unit (EHT MU PPDU), Extreme High Throughput Trigger-Based Physical Protocol Data Unit (EHT TB PPDU), and so on.

The following TWT Agreement Types have been defined. An individual TWT is a single TWT session that is negotiated between an AP and an STA. This ensures a specific service period of download (DL) and UL between AP and STA with expected traffic to be limited within the negotiated SP of 99% accuracy. The service period starts at specific time and runs for the SP duration and repeats every SP interval. A TWT requesting STA communicates the Wake Scheduling information to its TWT responding AP, which then devises a schedule and delivers the TWT values to the TWT requesting STA when a TWT agreement has been established between them.

For a Solicited TWT, the STA initiates the TWT setup with the AP. For a Unsolicited TWT the AP initiates the TWT setup with STA. The AP sends a TWT response with a service period which is accepted by STA. For a Broadcast TWT the AP requests the STA to participate in the broadcast TWT operation, either in an on-going broadcast SP or a new SP.

In upload (UL) OFDMA random access (UORA), the trigger frames may indicate the random RUs that may only be used for low latency or NS/EP frame transmission. A specific association ID (AID) may be used in User Info fields to announce the specific random RUs for low latency or NS/EP frame transmission. In UORA, when the random RUs can be shared by NS/EP frames and other frames, NS/EP frames may have higher priority to use the random RUs. Also, in UORA, the trigger frame may indicate the random RUs are only for the STAs that require low latency or NS/EP service. Also, the separated UORA parameters may be announced for NS/EP frame transmission in random RUs.

An AP may announce whether it supports low latency or NS/EP service, e.g., in the Extended Capabilities element. A STA that supports low latency or NS/EP service may select an AP that supports low latency or NS/EP to associate with. A STA may announce whether it supports or requests low latency or NS/EP service, e.g., in the Extended Capabilities element. An AP may accept an association request only from the STAs that support or request low latency or NS/EP service when the basic service set (BSS) is congested.

A specific TWT agreement may be used only for the low latency or NS/EP service. In a TWT SP for low latency or NS/EP service, only the low latency or NS/EP frames and the frames that are associated with the transmission of low latency or NS/EP frames (i.e., control frames, sounding related frames) may be transmitted. In an alternative approach, other data/management frames can be transmitted in a TWT SP for low latency or NS/EP service, only after all the buffered low latency or NS/EP frames are transmitted correctly.

The individual TWT Request frame may indicate whether the TWT requester requests TWT agreement for low latency or NS/EP service. The TWT responder may give the individual TWT request for low latency or NS/EP service higher priority when deciding whether to accept the request or not.

An AP indicates whether a broadcast TWT SP is used for low latency or NS/EP service or not. A broadcast TWT SP for low latency or NS/EP service only allows the STAs that support/request low latency or NS/EP service to join the TWT SP.

In one embodiment, a TWT element for TWT negotiation, broadcast TWT announcement includes the service type field to indicate the various service types (including low latency type, NS/EP type, and other types) that the TWT is used for.

In one embodiment, the TWT setup request may carry the TSPEC of low latency or NS/EP to help the AP to decide whether to accept the TWT setup request or not.

An AP may announce that it will not accept the association request from STAs that do not support or request low latency or NS/EP service in the Beacon, Probe response, FILS Discovery frame, etc. The criteria for the announcement is implementation specific.

Also, an AP may reject a TWT setup request from STAs that do not request low latency or NS/EP service while accepting the TWT setup requests from STAs for low latency or NS/EP service.

An AP may announce it will not accept a TWT Request from STAs that do not support or request low latency or NS/EP service in the Beacon, Probe response, FILS Discovery, Association Response frame, etc. Again, the criteria for the announcement is implementation specific.

An AP MLD may have multi-link capabilities where links are set up based upon different radio bands. Different traffic to be transmitted by the AP may be assigned a traffic identifier (TID). The TIDs may be mapped to the different links. Various different mappings are possible. For example, all TIDs may be allowed on each of the available links. In another example, some of the TIDs may be assigned to only be transmitted on one link and the rest on a second link. Further, some of the TIDs may be allowed on both links, while the remaining TIDs may only be assigned to one link.

As a default mapping, each TID may be mapped to all the available links. The TID to link mapping that is different from the default mapping is done through a negotiation. It is up to the recipient of a TID to link mapping request to decide whether to accept or reject the request. With these TID to link mapping rules, it is difficult to provide the low latency or NS/EP service. For UL traffic, a STA multi-link device (MLD) may transmit its frames with a specific TID using any links. For DL traffic, a power save STA MLD may select any link to receive any frames with any TID from any links.

An AP MLD that that requires or supports low latency or NS/EP service may announce the TID to link mapping for STA MLDs that require low latency or NS/EP service. The STA MLDs that requires low latency or NS/EP service need to respect the TID to link mapping announced by the AP MLD in order to ensure the guaranteed QoS. In one embodiment, the UL/DL TID may have the same mapped links. In another embodiment, the UL/DL TID may have different mapped links.

When a STA MLD that requires or supports low latency or NS/EP service receives the TID to link mapping request from its associated AP MLD, the STA MLD sends the response to accept the request. In an alternative embodiment, the AP MLD may transmit different a TID to link mapping indication to different STA MLDs that require low latency or NS/EP service. In this situation, a response from the STA MLDs is not needed.

Once a STA MLD that requires or supports low latency or NS/EP service receives the TID to link mapping announced by the AP MLD, the STA MLD uses the announced links for a TID to transmit/receive the frames of the TID. This allows the TID to link mapping to be managed in order to achieve the QoS required by the low latency or NS/EP service.

In the initial discussion above regarding TWT, the TWT negotiation may allocate a specific TWT agreement (TWT SPs) to the low latency service or NS/EP service. For the current rules regarding the use of TWT SP, once the end time of the negotiated TWT SP arrives, the frame exchange for the TWT agreement needs to stop. The non-EHT STAs, the EHT STA MLDs that do not support NS/EP service may still be transmitting PPDUs when the negotiated TWT SP starts. As a result, the STAs with low latency or NS/EP service cannot be guaranteed the use of the negotiated SPs.

When there is ongoing frame exchanges at the beginning of the negotiated TWT SP of low latency or NS/EP service where the frame exchanges are not related to the TWT requesters of the TWT SP, the AP MLD may extend the TWT SP to do frame exchanges with the TWT requesters until the negotiated SP duration is guaranteed. The APs affiliated with the AP MLD may set the Responder PM Mode subfield to 1 even if not all associated STAs indicate the support of TWT. A STA supporting the TWT will not transmit frames to the APs outside the negotiated TWT SPs that the STA established with the AP. The APs will not go to sleep outside the negotiated TWT SPs in order to service the STAs that do not support TWT SPs. These rules may be applied to an AP not affiliated with an AP MLD or an AP MLD with single AP affiliated with it.

A restricted TWT SP may be implemented to help facilitate the transmission of low latency or NS/EP frames. An EHT AP may announce the restricted TWT SP(s) for traffic that requires a guaranteed QoS. Any EHT STA within the BSS that supports low latency or NS/EP service shall end its TXOP before the start of the restricted SP(s). Broadcast TWT and individual TWT may be used for a restricted TWT.

Figure 2:
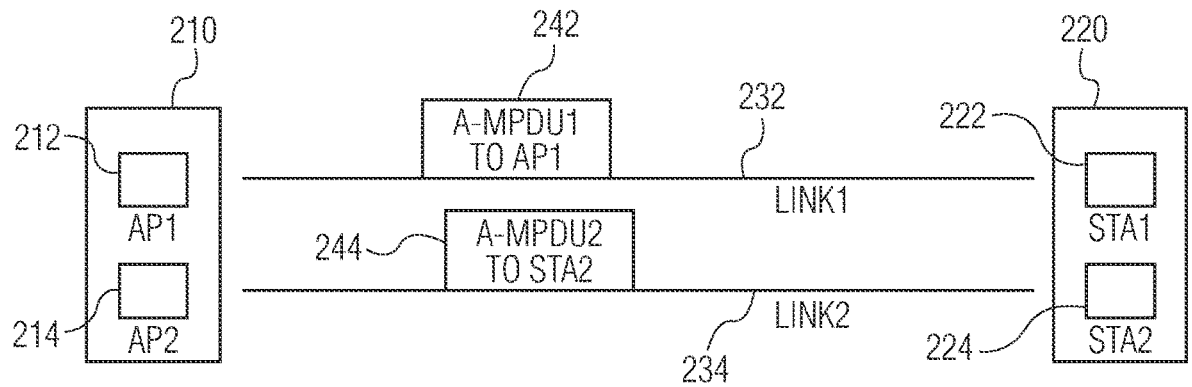
FIG. 2 illustrates the communication between a STR AP MLD and a NSTR STA MLD.

MLDs may be allow for simultaneous transmit and receive (STR) in multiple links. MLDs that cannot transmit and receive at the same time in multiple links are non-STR (NSTR) MLDs. FIG. 2 illustrates the communication between a STR AP MLD and a NSTR STA MLD. The STR STA MLD 210 may include an AP1 212 and AP2 214. The NSTR STA MLD may include a STA1 222 and STA2 224. Link 1 232 is a link between AP1 212 and STA1 222. Link 2 234 is a link between AP2 214 and STA2 224. FIG. 2 illustrates a A-MPDU1 242 transmitted by STA1 222 to AP1 212 on link 1 232. Further, A-MPDU2 244 is transmitted by AP2 214 to STA 2 224 on link 2 234. Because NSTR STA MLD 220 cannot receive and transmit simultaneously, the A-MPDU2 244 cannot be received by STA2 224, and hence its transmission should be restricted.

Figure 3:
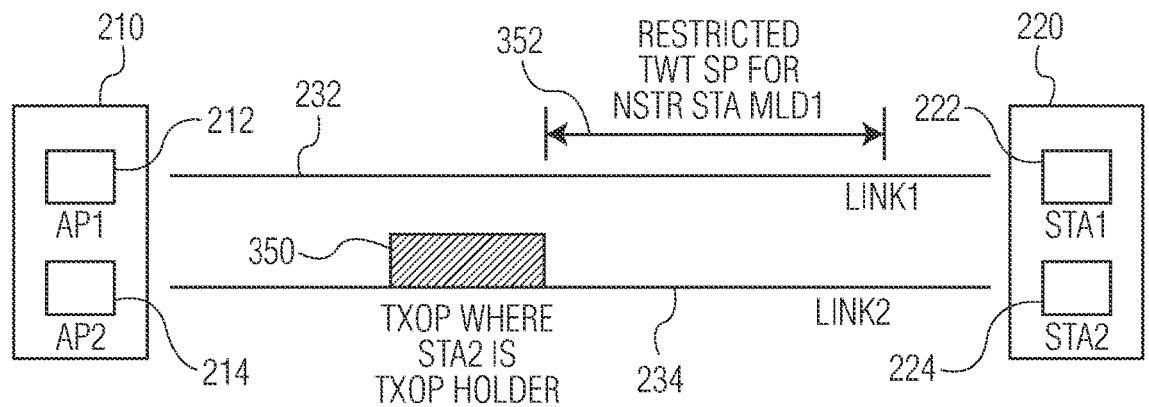
FIG. 3 illustrates a transmission on link 2 between AP2 and STA2.
Figure 4:
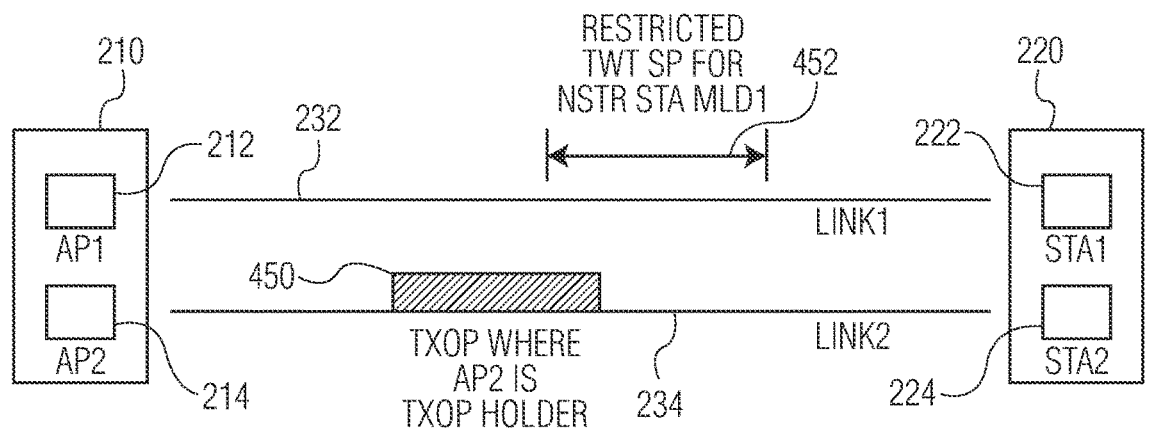
FIG. 4 illustrates a transmission on link 2 between AP2 and STA2 where the transmission overlaps a restricted TWT.

An EHT STA 222 that negotiates a restricted TWT SP with an AP 210 in one link (e.g., link 1 232) may be affiliated with a NSTR STA MLD 220. The AP's frame exchanges on link 2 234 to the NSTR STA MLD 220 may collide with the frame exchange on link 1 232 in the restricted TWT SP if no restriction is added to the AP MLD 210. FIG. 3 illustrates a transmission 350 on link 2 234 between AP2 214 and STA2 224. FIG. 3 also illustrates a restricted TWT SP 352 for NSTR STA MLD1. FIG. 4 illustrates a transmission 450 on link 2 234 between AP2 214 and STA2 224 where the transmission overlaps a restricted TWT. The restricted TWT SP 452 is for NSTR STA MLD1.

A first solution to preventing collisions includes limiting any transmission 350 on link 2 to end before the restricted TWT SP 352 starts for link 1. When an AP MLD 210 negotiates a restricted TWT SP 352 with the NSTR STA MLD 220 in one link (link 1 232 in this case), AP2 214 which is associated with link 234 shall end its TXOP 350 before the start of the restricted TWT SP 352 unless AP2's TXOP can avoid transmit while receive at NSTR STA MLD where the following are true: STA2 224 of the NSTR STA MLD 220 corresponding to link 2 234 is the TXOP responder in the TXOP 250; and link 1 232 and link 2 234 are a pair of links with NSTR capability at the STA MLD 220.

A When an AP MLD 210 negotiates a restricted TWT SP 452 with a NSTR STA MLD in one link (link 1 232 in this case), the STA2 224 associated with link 2 234 shall end its TXOP 450 before the start of the restricted SP 452 unless AP2's TXOP can avoid transmit while receive at NSTR STA MLD where the following are true: STA2 224 of the NSTR STA MLD 220 corresponding to link 2 is the TXOP initiator in the TXOP 450; and link 1 232 and link 2 234 are a pair of links with NSTR capability at STA MLD 220.

STA2 associated with link 2 234 also shall not initiate the transmission to the AP MLD within the restricted TWT SP.

The AP may announce the individual TWT SP in Beacon or other broadcast management frames. The STAs that negotiates the TWT SP with the associated AP may not receive the Beacons. When the individual restricted TWT SPs are changed, the AP let the STAs know the changes. This may be accomplished by broadcasting the updated restricted TWT SPs in the TWT SP.

TWT SPs (normal TWTP SP or restricted TWT SP) may also be used for peer to peer (P2P) communication between two STAs, for example STA1 and STA2. For P2P communication where at least one STA of the P2P communication associates with the AP, the associated STA (say STA1) may negotiate the restricted TWT SP with its associated AP. The STA2 which is the STA that does not do the TWT negotiation with the AP may notify STA1 of its available time for STA1 to use in the TWT negotiation. STA1 then notifies STA2 of the negotiated restricted TWT SP. Accordingly, even though STA2 is not directly associated with the AP, a restricted TWT SP may be negotiated for use between STA1 and STA2 for P2P communication.

The system and method described herein may be carried out using specific hardware to perform the actions or software running on a processor may implement the embodiments. The processor may be connected to memory and storage, where the software instructions are stored in the storage. The processor may be any general purpose processor, a graphics processor, a signal processor, or any other type of specialized processor.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a first wireless device for providing a high priority communication service for a high priority traffic class between the first wireless device and a second wireless device, comprising:
    announcing support for the high priority communication service;
    receiving an association request from the second wireless device for the transmission of high priority traffic using the high priority communication service;
    accepting the received association request; and
    negotiating a restricted target wakeup time (TWT) service period (SP) for the high priority communication service between the first wireless device and the second wireless device,
    wherein higher priority is given for the transmission of high priority frames using the high priority traffic service.

2. The method of claim 1, further comprising receiving a TWT set up request from the second wireless device.

3. The method of claim 1, wherein support for the high priority service is announced in a management frame.

4. The method of claim 1, wherein a trigger frame sent by the first wireless device is configured to solicit high priority traffic frames.

5. The method of claim 4, wherein a buffer status report for high priority traffic frames is received from the second wireless device in response to the trigger frame.

6. The method of claim 5, wherein the buffer status report for high priority traffic is explicitly or implicitly indicated.

7. The method of claim 5, wherein the buffer status report of high priority traffic is indicated by the high efficiency (HE) control filed.

8. The method of claim 1, further comprising announcing high priority enhanced distributed channel access (EDCA) parameters for high priority traffic.

9. The method of claim 8, wherein the EDCA parameters includes an element ID and element ID extension.

10. The method of claim 8, wherein the EDCA parameters includes a CWmax value that is smaller than a CWmax value for non-high priority traffic.

11. The method of claim 8, wherein the EDCA parameters includes CWmin and CWmax values that are smaller than CWmin and CWmax values for non-high priority traffic.

12. The method of claim 8, wherein the EDCA parameters includes an AIFSN that gives the high priority traffic a higher priority to use a medium.

13. The method of claim 8, wherein the first wireless device cannot disable the high priority EDCA.

14. The method of claim 8, wherein the first wireless device cannot disable the high priority EDCA unless sufficient resources are allocated to the high priority service.

15. The method of claim 1, further comprising receiving an announcement from the second wireless device indicating traffic characteristics of its high priority traffic.

16. The method of claim 15, wherein negotiating the restricted TWT SP for the high priority communication service is based upon the announced traffic characteristics.

17. The method of claim 15, wherein the announced traffic characteristics are in an enhanced traffic specification (TSPEC) element, wherein the enhance TSPEC element includes one of peak data rate, mean data rate, inactive interval, and burst size.

18. The method of claim 1, wherein the first wireless device announces support of the high priority communication service using an extended capability element.

19. The method of claim 1, further comprising receiving an announcement from the second wireless device configured to announce support of the high priority communication service using an extended capability element.

20. The method of claim 19, wherein the first wireless device only accepts the received association request when the second wireless device supports the high priority communication service.

21. The method of claim 1, wherein the negotiated TWT SP includes a service type field indicating the type of service associated with the TWT SP.

22. The method of claim 1, wherein the negotiated TWT SP is in response to an individual TWT request.

23. The method of claim 1, wherein the negotiated TWT SP is in response to a broadcast TWT request.

24. The method of claim 1, wherein only high priority traffic and associated control frames are transmitted during the restricted TWT SP.

25. The method of claim 1, wherein non-high priority traffic and associated control frames may only be transmitted during the restricted TWT SP after all high priority traffic has been transmitted.

26. The method of claim 1, wherein the first wireless device is a multi-link device (MLD) and the second wireless device is a MLD, further comprising:
    negotiating a traffic identifier (TID) to link mapping rules to support the high priority communication service.

27. The method of claim 1, wherein negotiating a restricted TWT SP is based upon availability information from a third wireless device, wherein the second wireless device and the third wireless device implement peer to peer transmission.

28. A first wireless device for providing a high priority communication service for a high priority traffic class between the first wireless device and a second wireless device, comprising:
    a processor configured to,
        announce support for the high priority communication service;
        receive an association request from the second wireless device for the transmission of high priority traffic using the high priority communication service;
        accept the received association request; and
        negotiate a restricted target wakeup time (TWT) service period (SP) for the high priority communication service between the first wireless device and the second wireless device,
    wherein higher priority is given for the transmission of high priority frames using the high priority traffic service.

29. A first wireless device for providing a communication service for a traffic class between the first wireless device and a second wireless device, comprising:
    a processor configured to,
        announce support for the communication service;
        receive an association request from the second wireless device for the transmission of traffic using the communication service;
        accept the received association request; and
        negotiate a restricted target wakeup time (TWT) service period (SP) for the communication service between the first wireless device and the second wireless device,
    wherein a predetermined priority is given for the transmission of frames in the traffic class using the communication service.

* * * * *